Sept. 24, 1963 P. SCHEUZGER 3,104,930

GRAPHIC COMMUNICATION RECORDING DEVICE

Filed Nov. 14, 1960

INVENTOR.

PETER SCHEUZGER

BY

Horton, Davis, Brewer & Brugman

Attys.

3,104,930
GRAPHIC COMMUNICATION RECORDING DEVICE

Peter Scheuzger, Highland Park, Ill., assignor, by mesne assignments, to Victor Comptometer Corporation, Chicago, Ill., a corporation of Illinois Filed Nov. 14, 1960, Ser. No. 68,868
5 Claims. (Cl. 346—139)

Figures 1, 2:
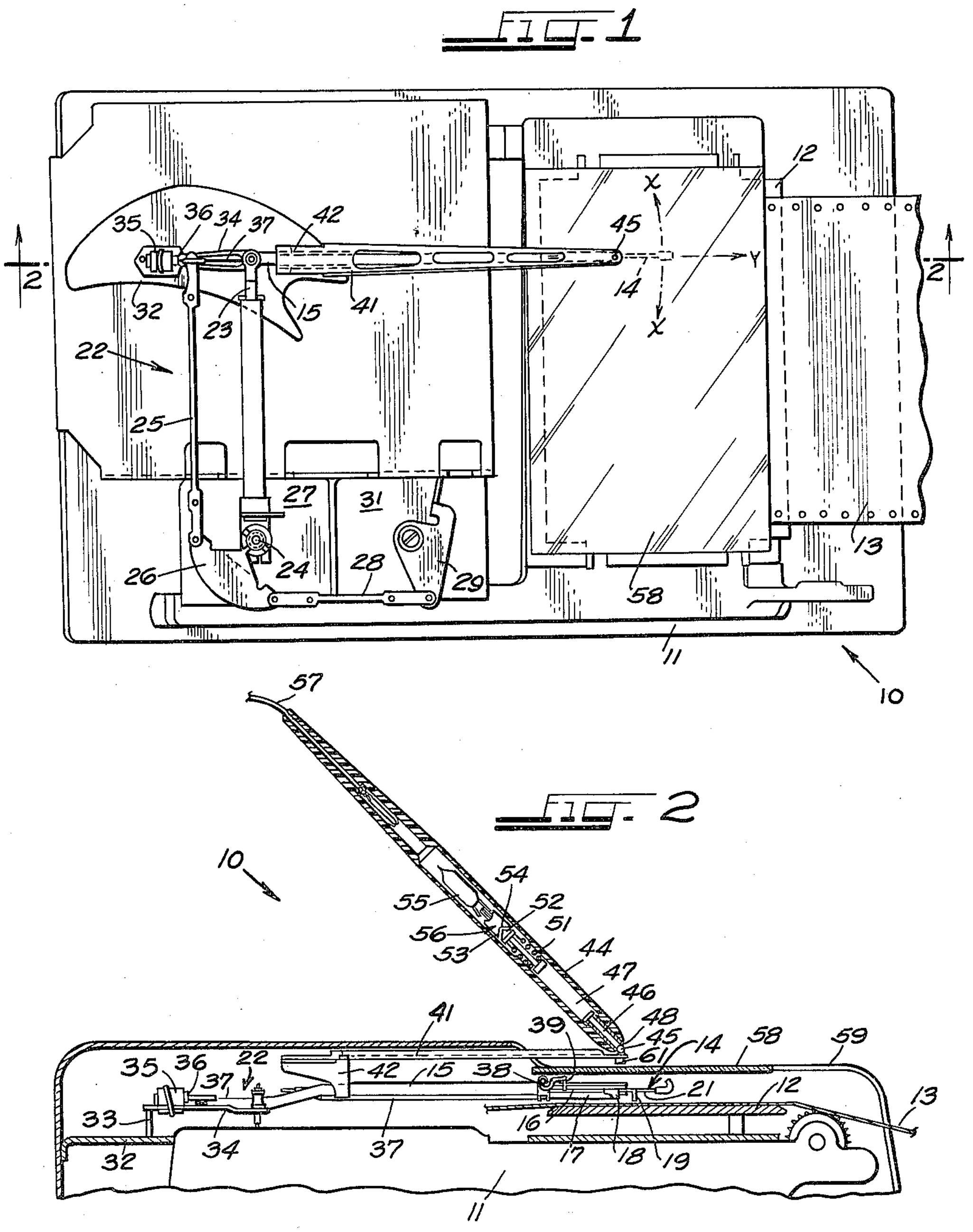

This invention relates to recording devices and more particularly to a new and improved recording pen assembly for a transceiver in a graphic communication system.

In a graphic communication system, in which written data, sketches, or the like are simultaneously reproduced at a transmitter and at a receiver, it may be necessary to transmit data and to receive data from any given station. Because many of the devices and operating circuits used for transmission are essentially similar to those used for reception, a transceiver unit may be advantageously employed.

With respect to the recording pen, however, the requirements for transmitter and receiver operation are substantially different from each other. Thus, in transmission the weight and inertia of the pen is not critical, since the motive power is supplied from an external source, usually the hand of the operator. The receiver pen, however, should be light in weight and low in inertia in order to perform the necessary rapid movements at high accelerations without imposing excessive demands upon the driving apparatus of the receiver. In transmitter operation, some means must be provided to generate a pen contact signal representative of movements of the transmitter pen into and out of contact with a recording medium. There is no need for a pen contact sensing device in operation of a conventional receiver; on the other hand, some provision must be made to move the receiver pen into and out of recording position in response to a received pen contact signal.

One effective and efficient transceiver pen structure, which meets the requirements of both transmitter operation and receiver operation, is described and claimed in the co-pending application of Peter Scheuzger, Serial No. 846,607, filed October 15, 1959, now U.S. Patent No. 2,995,623, issued August 8, 1961. The transceiver pen structure shown in that application incorporates a contact-sensing switch directly into a pen structure which is light in weight and quite suitable for receiver operation; provision is also made for effective mounting of an actuating member or stylus on the pen to permit transmitter operation. The transceiver pen structure described and claimed in that application, however, must remain exposed for effective transmitter operation because the stylus is directly mechanically connected to the recording pen. In many applications, this is not particularly disadvantageous. In those instances where the transceiver may be handled carelessly, as by excessive pressure on the stylus during transmitter operation or by bringing foreign objects into contact with the recording pen, however, the possibility of damage to the pen and resulting disablement of the transceiver becomes important.

Accordingly, it is an object of the present invention to disassociate the actuating stylus of a transceiver pen assembly from the recording pen, with respect to movements of the pen toward and away from a recording medium, in order to protect the recording pen against damage from careless handling and similar causes.

Another object of the invention is to disassociate the actuating stylus of a recording pen assembly for a graphic communication transceiver from the recording pen, with respect to movements into and out of contact position, but to retain direct mechanical control of the recording pen, by a stylus, for movements across the recording medium.

A further object of the invention is to provide positive protection for the recording pen in a graphic communication transceiver but to retain the appearance and "feel" of direct pen control during a transmission operation.

Another object of the invention is to provide a recording pen assembly for a graphic communication transceiver in which the conflicting requirements of transmitter operation and receiver operation are effectively resolved and the recording pen is completely covered and protected.

A further object of the invention is to provide a new and improved recording pen assembly for a graphic communication transceiver which achieves the foregoing objects without entailing the addition of excessive weight to the recording pen structure.

A corollary object of the invention is to provide a new and improved recording pen assembly for a graphic communication transceiver which is simple and economical in construction yet highly effective in operation both for transmission and reception.

Accordingly, the present invention is directed to a recording pen assembly for a graphic communication transceiver of the kind including a recording platen and means for supporting a recording medium upon the platen. A pen assembly constructed in accordance with the invention comprises a recording pen and pen linkage means supporting the pen for movement across the platen surface. Electrically actuated pen contact means are provided and are utilized for moving the pen between a normal position displaced from the recording medium and a recording position in engagement with the recording medium. Preferably, the pen contact means employed for transmitter operation is the same contact means as is used for receiver operation. A stylus support member is connected in mechanical driving relation to the pen linkage means and extends into spaced alignment with the recording pen. A stylus is removably mounted upon this support member and in alignment with the pen; the stylus is utilized to actuate the pen linkage under manual control, through the stylus support member. In addition, means are provided for actuating the aforementioned pen contact means to move the pen to its recording position in response to a predetermined force urging the stylus toward the platen, this means comprising a sensing switch that is preferably mounted in the stylus and is electrically coupled to the pen contact means. Preferably, a transparent guard member is mounted in fixed position intermediate the stylus support member and the recording pen to protect the stylus and the pen from damage in the event of application of excessive force to the stylus.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a plan view of a graphic communication transceiver including a recording pen assembly constructed in accordance with the present invention, the cover of the transceiver being removed to show the pen linkage mechanism; and FIG. 2 is a sectional elevation view taken approximately along line 2—2 in FIG. 1.

FIGS. 1 and 2 show a graphic communication transceiver 10 including a base 11 upon which a recording platen 12 is mounted. A suitable recording medium 13 is supported on the platen 12. For example, the recording medium 13 may comprise a web of ordinary paper fed from a suitable roll or other supply located within the base portion of the machine. The paper web may be provided with sprocket-engaging apertures along the two opposed edges thereof and means may be provided in the transceiver 11 for feeding predetermined lengths of the paper web across the platen 12. The mounting of the platen and the apparatus used for feeding the paper may, for example, be of the kind described in the co-pending application of Peter G. S. Mero, Serial No. 822,236, filed June 23, 1959, now U.S. Patent No. 3,031,209, issued April 24, 1962. Inasmuch as this part of the transceiver is not critical to the present invention, it has been illustrated only generally in FIGS. 1 and 2.

The transceiver 10 further includes a recording pen 14 that is mounted upon a pen support arm 15 as best shown in FIG. 2. The pen 14 comprises a capillary ink feeder tube 16, one end of which is connected to a suitable ink supply (not shown). The end of the ink feeder tube 16 adjacent the platen 12 is of cantilever construction and is located within a slot 17 at the free end of the cantilever pen support arm 15. A guide shoe 18 may be affixed to the ink conduit 16 near the end thereof; this guide shoe engages the side walls of the slot 17 in the pen support arm to guide movement of the pen 14 into and out of contact with the recording medium 13. A nib member 19 is connected to the ink conduit 16 near the end thereof and projects from the ink conduit toward the paper web 13. It is the nib 19 which engages the recording medium to inscribe a message thereon. In the preferred construction illustrated in FIG. 2, there is an extension 21 on the ink conduit 16, beyond the nib 19, which holds a reserve supply of ink that is effective to maintain the ink flow when the pen 14 is accelerated rapidly in a direction away from the ink source. This particular pen construction, utilizing the reservoir 21, is described and claimed in the co-pending application of Robert Gill and Peter G. S. Mero, Serial No. 842,693, filed September 28, 1959.

The pen support arm 15 forms a part of a pen linkage 22 that is utilized to control operation of the pen 14 when the transceiver 11 is utilized as a receiver, the same linkage being utilized in the development of coordinate control signals when the transceiver is used as a transmitter. Thus, the pen support arm 15 is pivotally mounted upon a driving arm 23, the driving arm 23 being mounted for rotation with respect to an axis 24. The pen arm 15 is also connected by a link 25 to a second driving arm 26 that is independently mounted for rotation with respect to the axis 24. Pivotal movement of the driving arm 23, relative to the axis 24, may be effected by a first servo motor 27 to control movement of the pen 14 along a first axis designated in FIG. 1 as the Y-axis. The driving arm 26 is connected by a pair of links 28 and 29 to a second servo motor 31. The servo motor 31 controls rotational movement of the drive arm 26, which, in turn, actuates the pen arm 15 to move the pen 14 along a second axis designated as the X-axis. The pantograph or pen linkage 22 is essentially similar in construction to that described and claimed in Patent No. 2,583,535 to Robert Adler issued January 29, 1952 on an application filed April 2, 1949. The connection of a similar linkage in a transceiver, providing for use of the linkage in moving the pen in response to received signals and also providing for the generation of coordinate control signals when the linkage is actuated manually, is described in Patent No. 2,583,720 to Robert Adler issued January 29, 1952 on an application filed March 16, 1949.

An auxiliary control is also preferably provided for the movements of the pen arm 15. This additional control comprises a margin guide 32 which is positioned to engage a guide pin 33 which projects downwardly from the rear section 34 of the pen arm 15. As thus far described, the transceiver 10 is, essentially, a graphic communication receiver constructed in accordance with knowledge previously available in the art.

As noted in the aforementioned patent to Adler, No. 2,583,535, it usually is desirable to provide a counterweight at the rear end of the pen support arm. In this instance, the counterweight comprises a solenoid 35. The armature 36 of the solenoid 35 is connected by a wire 37 to a crank member 38 that is pivotally mounted upon the front or pen end of the pen support arm 15. The crank 38 is disposed in engagement with one end of a plunger 39, the other end of the plunger being engaged with the ink conduit 16 of the recording pen 14. Thus, the solenoid 35 serves as a counterweight for the pen linkage and also is incorporated in an electrically actuated pen contact means which is effective to move the nib 19 of the pen 14 into, and permit movement thereof out of, recording position. Accordingly, only a brief description of the receiver operation is deemed necessary herein. When the transceiver is utilized as a receiver, coordinate control signals are employed to energize the two servo motors 27 and 31. These servo motors drive the pen linkage 22 to move the pen 14 in precise correspondence with the movements of a recording pen at a transmitter. That is, the pen 14 is moved transversely of the platen 12 in accordance with received signals determined by corresponding movements of a pen at a transmitter in the course of recording data at the transmitter.

It is also necessary to move the pen 14, and particularly the nib 19, into and out of engagement with the paper recording medium 13. For example, in a written message, the nib must be returned to its elevated or normal position as shown in FIG. 2 whenever the transmitter pin is lifted as in the rear movement between two words. This is accomplished by the actuation of the solenoid 35 in response to a received pen contact signal. Thus, when the received pen contact signal signifies that the pen must be engaged with the recording medium 13 on the platen 12, the solenoid 35 is energized, pulling the connecting wire 37 toward the solenoid and pivoting the crank 38 in a clockwise direction as seen in FIG. 2. This drives the plunger 39 down and presses the ink conduit 16 downwardly through a relatively short distance to engage the nib 19 with the paper. When the received pen contact signal indicates that the pen should be lifted, the solenoid 35 is de-energized, slackening the connecting line 37. Under these circumstances, the resilience of the ink conduit 16 restores the pen to its original or unactuated normal position.

For use of the transceiver 10 as a transmitter, it is necessary that means be provided for manual operation of the recording pen 14. In accordance with the present invention, a stylus support member 41 is connected in mechanical driving relation to the pen linkage 22 to permit manual actuation of the linkage and, accordingly, the pen 14. In the preferred embodiment illustrated in FIGS. 1 and 2, the stylus support member 41 comprises a cantilever arm which is rigidly affixed to the pen support arm 15 by the bracket member 42. The bracket member 42, in this instance, is an integral part of the stylus support member 41. The stylus support arm 41 extends approximately parallel to the pen support arm 15 in spaced alignment therewith, the free end of the cantilever stylus support member being located in approximate alignment with the writing nib 19 of the pen 14. In the preferred arrangement, the end of the stylus support arm 41 is not directly over the nib 19, but is spaced rearwardly of the nib by a very small distance in approximate alignment with the normal inclination of a writing stylus relative to the nib. However, this minor differential in alignment is not essential and the end of the cantilever arm 41 may be located directly over the writing nib.

The pen assembly of the present invention includes a stylus 44 that is removably mounted on the tip end (the free end) of the cantilever stylus support arm 41. The mounting arrangement comprises a spherical keeper member 45 affixed to the end of the cantilever arm 41 and engageable with a pole piece 46 mounted at the end of the stylus 44. The pole piece 46 engages a permanent magnet 47 that is mounted within the housing of the stylus 44. Preferably, the pole piece 46 is provided with a non-magnetic element 48 disposed in an encompassing relation thereto to afford, with the pole piece, a magnetic coupling of the kind described and claimed in Patent No. 2,937,917 to Myron L. Anthony issued May 24, 1960 on an application filed August 7, 1957.

The permanent magnet 47 is longitudinally movable through a relatively small distance within the housing of the stylus 44, being biased outwardly thereof by suitable means such as a spring 51. The magnet is mechanically connected to a conical contact member 52 that is positioned to engage and complete an electrical circuit between a pair of contact members 53 and 54. The contact elements 52—54 and the spring 51 comprise the principal elements of a sensing switch 56 which is responsive to pressure applied to the stylus 44 to urge the stylus toward the platen 12 and the pen 14. The stylus 44 may also include an automatic cut-off switch 55. Provision is made for coupling the sensing switch 56 and the cut-off switch 55 to the operating circuits of the transceiver 10; the electrical connection is generally illustrated by the connecting cable 57. In particular, the sensing switch 56 is connected in a suitable operating circuit to the solenoid 35 to energize the solenoid whenever the transceiver is conditioned for operation as a transmitter and the switch 56 is closed.

As noted hereinabove, the cantilever stylus support arm 41 is disposed in spaced relation to the recording pen 14. In the preferred embodiment of the invention shown in FIGS. 1 and 2, a transparent guard member 58 is mounted on the housing 59 of the transceiver 10. The guard member 58, which may be formed of glass or transparent plastic, is interposed between the stylus support arm 41 and the recording pen 14 to protect the pen from damage in the event of application of excessive force to the stylus 44 or to the stylus support arm 41 tending to drive these members downwardly toward contact with the delicate pen structure 14. Preferably, the guard member 58 is spaced only a short distance from the free end of the cantilever arm 41 to prevent bending of the arm 41, and subsequent distortion, in the event that some foreign object engages the stylus support arm or excessive force is carelessly applied to the stylus support arm during use of the stylus. A small "shoe" or "glider" 61 may be mounted on the tip end of the arm 41, immediately under the keeper 45, to engage the transparent guard plate 58 when the stylus 44 is pressed toward the platform 12. The glider 61 is preferably formed of nylon or other plastic having a low coefficient of friction with respect to the transparent guard plate.

When the transceiver 10 is used as a transmitter, the stylus 44 is first mounted upon the cantilever support arm 41 by engaging the pole piece 46 with the keeper 45. The stylus can then be used to move the stylus support arm 41 laterally of the platen 12 in any desired direction. Because the stylus is effectively connected in mechanical driving relation to the pen 14, through the stylus support arm 41 and the pen support arm 15, any movement of the stylus transversely of the platen results in a corresponding movement of the pen 14. Thus, it is possible to use the stylus 44 to drive the pen through any and all of the movements necessary for recording of handwriting, sketches, or any other data.

Movements of the pen 14 toward and away from the recording medium 13, which are equally necessary to effective data recordation, are not mechanically controlled by the stylus 44. In accordance with the present invention, the stylus is physically disassociated from the recording pen with respect to these movements. When the stylus is pressed toward the recording medium 13 and the pen 14, as naturally occurs at the beginning of a written word or any other recording operation, the sensing switch 56 is closed. Only a relatively light pressure on the stylus, sufficient to overcome the bias afforded by the spring 51, is necessary to actuate the sensing switch. When the switch 56 closes, by engagement of the contact 52 with the contact elements 53 and 54, an electrical circuit is completed which energizes the solenoid 35. Consequently, the solenoid actuates the linkage comprising the connecting wire 37, the crank 38, and the plunger 39 to engage the nib 19 of the pen 14 with the recording medium 13 in exactly the same manner as during a receiving operation. Thus, a normal writing or drawing action, using the stylus 44, controls operation of the pen 14 when the transceiver 10 is used as a transmitter, despite the fact that the stylus is physically isolated from the recording pen with respect to movements toward and away from the platen. Because the stylus is aligned with the recording pen, the pen assembly of the invention retains much of the normal "feel" and appearance of direct writing control. On the other hand, the relatively delicate pen 14 is completely protected against damage from external sources by its physical separation from the stylus and by the guard member 58. The stylus support arm 41, although it adds slightly to the weight of pen assembly and particularly the pen arm 15, may be made relatively light in weight as compared to the arm 15, and consequently does not adversely affect receiver operation. Furthermore, the guard plate 58 protects the arm 41 against bending if the stylus 44 is pressed downwardly too hard or if the arm is engaged by some other object.

Because of its length and lightweight construction, the arm 41 may be relatively easy to deflect toward the transparent plate 58 in the course of a writing operation, even though the arm is quite rigid in a direction parallel to the surface of platform 12. To obtain optimum "feel" in operation of the stylus, the spring 51 may be constructed to keep the switch 56 open until the glider 61 is engaged with the plate 58. The glider thus slides over the surface of plate 58, during writing, in a manner precisely analogous to normal movements of a pen.

Hence, while preferred embodiments of the invention have been described and illustrated, it is to be understood that they are capable of variation and modification.

I claim:

1. A recording pen assembly for a graphic communication transceiver including a platen and means for supporting a recording medium upon the platen, said pen assembly comprising: a recording pen; pen linkage means, including a pen support arm, supporting said pen for movement transversely of said platen; electrically actuated pen contact means for moving said pen between a normal position displaced from said recording medium and a recording position in engagement with said recording medium; a cantilever stylus support member, affixed to said pen support arm and extending parallel thereto into spaced alignment with said recording pen; a stylus, removably mounted on said support member, adjacent the end thereof, in alignment with said pen, for manual actuation of said linkage means through said support member; and means, comprising a sensing switch mounted within said stylus and electrically coupled to said pen contact means, for actuating said pen contact means to move said pen to said recording position in response to a predetermined force urging said stylus toward said platen.

2. A recording pen assembly for a graphic communication transceiver including a platen and means for supporting a recording medium upon the platen, said pen assembly comprising: a recording pen; pen linkage means supporting said pen for movement transversely of said platen; electrically actuated pen contact means for moving said pen between a normal position displaced from said recording medium and a recording position in engagement with said recording medium; a stylus support member, connected in mechanical driving relation to said pen linkage means, extending into spaced alignment with said recording pen; a stylus, removably mounted on said support member in alignment with said pen, for manual actuation of said linkage means through said support member and movable toward and away from said platen relative to said support member; means, comprising a sensing switch mounted within said stylus and electrically coupled to said pen contact means, for actuating said pen contact means to move said pen to said recording position in response to a predetermined force urging said stylus toward said platen and relative to said support member; and a transparent guard member mounted in fixed position intermediate said stylus support member and said recording pen to protect the stylus and the pen from damage in the event of application of excessive force to the stylus.

3. A recording pen assembly for a graphic communication transceiver including a platen and means for supporting a recording medium upon the platen, said pen assembly comprising: a recording pen; pen linkage means, including a cantilever pen support arm, supporting said pen for movement transversely of said platen, said pen being mounted on the free end of said arm; electrically actuated pen contact means for moving said pen toward and away from said platen between an initial position displaced from said recording medium and a recording position in engagement with said recording medium, said pen contact means comprising a plunger mounted on said arm in engagement with said pen and a solenoid connected to said plunger; a cantilever stylus support member connected in mechanical driving relation to said pen support arm and extending into spaced alignment with said recording pen; a stylus, removably mounted on said support member in alignment with said pen, for manual actuation of said linkage means through said support member; control means for actuating said pen contact means to move said pen to said recording position in response to a predetermined force urging said stylus toward said platen, said control means comprising a pressure-sensitive sensing switch mounted in said stylus and electrically connected in an energizing circuit for said solenoid; and a transparent guard member mounted in fixed position intermediate said stylus support member and said recording pen to protect the stylus and the pen from damage in the event of application of excessive force to the stylus.

4. A recording pen assembly for a graphic communication transceiver including a platen and means for supporting a recording medium upon the platen, comprising a recording pen; pen linkage means for supporting said pen for movements transversely of said platen; electrically actuated pen contact means for moving said pen from an initial position displaced from said recording medium to a recording position in engagement with said recording medium; a stylus support member, connected in mechanical driving relation to said pen linkage means, extending into spaced parallel alignment with said platen; a guard member interposed between said recording pen and said stylus support member in close proximity to said support member and extending substantially parallel to said platen; a stylus, removably mounted on said support member in alignment with said pen, for manual actuation of said linkage means through said support member; a low-friction glider member, mounted on said support member immediately adjacent the mounting for said stylus, for engaging said guard member; and means for actuating said pen contact means to move said pen to said recording position in response to a predetermined force urging said stylus toward said platen.

5. A recording pen assembly for a graphic communication transceiver including a platen and means for supporting a recording medium upon the platen, said pen assembly comprising: a recording pen; pen linkage means for supporting said pen for movement transversely of said platen; electrically actuated pen contact means for moving said pen toward and away from said platen between an initial position displaced from said recording medium and a recording position in engagement with said recording medium; a stylus support member, connected in mechanical driving relation to said pen linkage means, extending into spaced parallel alignment with said platen; a transparent guard member interposed between said recording pen and said stylus support member in close proximity to said support member and extending substantially parallel to said platen; a stylus, removably mounted on said support member in alignment with said pen, for manual actuation of said linkage means through said support member; a low-friction glider member, mounted on said support member immediately adjacent the mounting for said stylus, for engaging said guard member upon application of normal writing pressure to said stylus; and means, comprising a sensing switch mounted within said stylus electrically coupled to said pen contact means, for actuating said pen contact means to move said pen to said recording position in response to a predetermined force urging said stylus toward said platen and sufficient to engage said glider member with said guard member.

References Cited in the file of this patent

UNITED STATES PATENTS

| | | |
|---|---|---|
| 637,923 | Chase | Nov. 28, 1899 |
| 1,471,869 | Turner | Oct. 23, 1923 |
| 1,901,673 | Sleeper | Mar. 14, 1933 |
| 2,332,511 | Glassman et al. | Oct. 26, 1943 |
| 2,699,606 | Breau | Jan. 18, 1955 |